(12) United States Patent
Goldman et al.

(10) Patent No.: US 6,820,070 B2
(45) Date of Patent: Nov. 16, 2004

(54) METHOD AND TOOL FOR DATA MINING IN AUTOMATIC DECISION MAKING SYSTEMS

(75) Inventors: Arnold J. Goldman, Jerusalem (IL); Jehuda Hartman, Rehovot (IL); Joseph Fisher, Jerusalem (IL); Shlomo Sarel, Ma'aleh Michmash (IL)

(73) Assignee: Insyst Ltd., Jerusalem (IL)

( * ) Notice: Subject to any disclaimer, the term of this patent is extended or adjusted under 35 U.S.C. 154(b) by 568 days.

(21) Appl. No.: 09/731,978

(22) Filed: Dec. 8, 2000

(65) Prior Publication Data

US 2001/0054032 A1 Dec. 20, 2001

Related U.S. Application Data

(63) Continuation-in-part of application No. 09/588,681, filed on Jun. 7, 2000.

(51) Int. Cl.⁷ ............................................. G06F 17/00
(52) U.S. Cl. ........................................................ 706/46
(58) Field of Search ............................................. 706/46

(56) References Cited

U.S. PATENT DOCUMENTS

| | | | |
|---|---|---|---|
| 4,970,658 A | 11/1990 | Durbin et al. | |
| 5,325,466 A | 6/1994 | Kornacker | |
| 5,440,478 A | 8/1995 | Fisher et al. | |
| 5,479,340 A | 12/1995 | Fox et al. | |
| 5,483,468 A | 1/1996 | Chen et al. | |
| 5,526,522 A | 6/1996 | Takeuchi | |
| 5,546,507 A | 8/1996 | Staub | |
| 5,787,425 A | 7/1998 | Bigus | |
| 5,862,054 A | 1/1999 | Li | |
| 5,875,285 A | 2/1999 | Chang | |
| 6,032,146 A | 2/2000 | Chadha et al. | |
| 6,073,138 A | 6/2000 | de l'Etraz et al. | |
| 6,134,555 A | 10/2000 | Chadha et al. | |
| 6,240,329 B1 | 5/2001 | Sun | |
| 6,249,712 B1 | 6/2001 | Boiquaye | |
| 6,263,255 B1 | 7/2001 | Tan et al. | |

FOREIGN PATENT DOCUMENTS

WO     WO 00/00874     1/2000

OTHER PUBLICATIONS

Bettoni, MC, "Constructivist Foundations of Modeling A Kantian Perspective", *Int. J. Intell. Sys.*, 12(8):577–595, 1998.

Merritt et al, "Army Medical Knowledge Engineering System (AMKES)—A Three-Tier Knowledge Harvesting Environment", *Practical Applications of Java 1999 Conf. Proc.*

Scott, MC, "On the Epistemology and Management of Electronic Design Automation Knowledge", www.azstarnet.com/–scottmc/medak/Epistomology.

(List continued on next page.)

*Primary Examiner*—George B. Davis
(74) *Attorney, Agent, or Firm*—G.E. Ehrlich (1995) Ltd.

(57) ABSTRACT

In an automatic decision-making system, a method and a tool for the reduction of the dimension of data mining, which is automatically coupled to an empirical predictor of the system. The method includes a qualitative modeling of the interrelations between various objects whose attributes are relevant to a score made by the predictor according to which decisions are made, wherein this relevancy is determined by an input of a domain expert to the problem in hand. The model is called a Knowledge-Tree and its conclusions are represented by a graphical symbolization called the Knowledge-Tree map. Data mining, which follows the construction of the Knowledge-Tree map regards only datasets which are associated with logical and validated branches of the knowledge tree. Because the expert input which reduces the dimension of data mining was completed prior to data mining, interception by human reasoning is not needed after data mining and the decision making process can proceed automatically.

36 Claims, 13 Drawing Sheets

OTHER PUBLICATIONS

"Artifical Intelligence and Manufacturing: A Research Planning Report", L.D. Interrante, Ed., American Assoc. For Artifical Intelligence, AAAI Press, 1997.

Knights Technology, Inc. at–a–Glance, http://www.knights.com/ktglance.htm [18–pages].

Work in Progress: Visual Specification of Knowledge Bases, Gavrilova, et al http://www.csa.ru/Inst/gorb_dep/artific/IA/ben–last.htm [8–pages].

Object Space Solutions for a Connected World, http://www.ObjectsSpace.com/products/prodCatalyst.asp [11–pages].

Adventa Corporate Overview, http://www.adventact.com/corporat.htm [28 pages].

Domain Manufacturing, http://www.domainmfg.com/mfg/starfire/industry–specific–auto.htm [10 pages].

HPL Corporate http://www.hpl.com/Corporate/history.htm [6 pages].

SEMY Engineering Home Page http://www.sey.com [9 pages].

KLA–Tencor: Leading the Yield Management Market http://www.tencor.com [15 pages].

Yield Dynamics, Inc. http://www.ydyn.com/products/yield.htm [9 pages].

Triant Our Products http://www.triant.com/top.html [10 pages].

Final Model Business Case Report for the OSD CALS IWSDB Project, An MVP Joint Venture, ManTech International Corporation, Dec. 2, 1994, Kidwell et al., http://www2.dcnicn.com/cals/iwsdb/task07/html/a024/Fmodbus1.htm [77 pages].

Computer Aided Knowledge Engineering, British Steel, Mackenzie, http://www.cogsys.co.uk/cake/CAKE–Test-Site–BS.htm [12 pages].

METHOD AND TOOL FOR DATA MINING IN AUTOMATIC DECISION MAKING SYSTEMS

This is a continuation-in-part of U.S. application Ser. No. 09/588,681 filed Jun. 7, 2000.

Besides being a continuation-in-part of U.S. application Ser. No. 09/588,681 filed Jun. 7, 2000, incorporated by reference for all purpose as if fully set fourth herein, the present invention is also related to the following co-pending patent applications of Goldman, et al. which utilize it's teaching:

U.S. Patent application Ser. No. 09/633,824 filed Aug. 7, 2000, and U.S. patent application entitled-"System and Method for Monitoring Process Quality Control" filed Oct. 13, 2000 (hereinafter the POEM Application) which are both incorporated by reference for all purposes as if fully set forth herein.

BACKGROUND OF THE INVENTION

The present invention relates to the formation and the application of a knowledge base in general and in the area of data mining and automated decision making in particular.

Automatic decision-making is based on the application of a set of rules to score values of outcomes, which results from the application of a predictive quantitative model to new data.

The predictive quantitative model (sometimes referred to as an empirical model) is established by using a procedure called data mining.

Data mining describes a collection of techniques that aim to find useful but undiscovered patterns in collected data. The main goal of data mining is to create models for decision making that predict future behavior based on analysis of past activity.

Data mining extracts information from an existing database to reveal "hidden" patterns of relationship between objects in that data-base, which are neither known beforehand nor intuitively expected.

The term "data mining" expresses the idea that the raw material is the "mountain" of data and the data mining algorithm is the excavator, shifting through the vast quantities of raw data looking for the valuable nuggets of information.

However, unless the output of the data mining system can be understood qualitatively, it won't be of any use. I.e. a user needs to view the output of the data mining in a meaningful context to his goals, and to be able to disregard irrelevant patterns of the relations which were disclosed.

It is in this perception stage in which human reasoning, hereinafter referred to as "expert input", is needed to assess the validity and evaluate the plausibility and relevancy of the correlations found in the automated data mining and it is that indispensable expert input that prevents an accomplishment of a completely automated decision making system.

Several attempts have been made to eliminate this aforesaid need for the expert input, mainly by automatic organization or a priori restricting the vast repertoire of relationship patterns which are expected to be dug out by the data mining algorithm.

U.S. Pat. No. 5,325,466 to Kornacker describes the partition of data-base of case records into a tree of conceptually meaningfull clusters wherein no prior domaim-dependent knowledge is required.

U.S. Pat. No. 5,787,425 to Bigus describes an object oriented data mining framework mechanism which allows the separation of the specific processing sequence and requirement of a specific data mining operation from the common attribute of all data mining operations.

U.S. Pat. No. 5,875,285 to Chang describes an object oriented expert system which is an integration of an object oriented data mining system with an object oriented decision making system and U.S. Pat. No. 6,073,138 to de l'Etraz, et al. discloses a computer program for providing relational patterns between entities.

Recently, dimension reduction was applied in order to reduce the vast quantity of relations of relations identified by data mining.

Dimension reduction selects relevant attributes in the dataset prior to performing data mining. This is important for the accuracy of further analysis as well as for performance. Because the redundant and irrelevant attributes could mislead the analysis, including all of the attributes in the data mining procedures not only increases the complexity of the analysis, but also degrades the accuracy of the result.

Dimension reduction improves the performance of data mining techniques by reducing dimensions so that data mining procedures process data with a reduced number of attributes. With dimension reduction, improvement by orders of magnitude is possible.

The conventional dimension reduction techniques are not easily applied to data mining applications directly (i.e., in a manner that enables automatic reduction) because they often require a priori domain knowledge and/or arcane analysis methodologies that are not well understood by end users. Typically, it is necessary to incur the expense of a domain expert with knowledge of the data in a database who determines which attributes are important for data mining. Some statistical analysis techniques, such as correlation tests, have been applied for dimension reduction. However, these are ad hoc and assume a priori knowledge of the dataset, which can not be assumed to always be available. Moreover, conventional dimension reduction techniques are not designed for processing the large datasets that data mining processes.

In order to overcome these drawback in conventional dimension reduction, U.S. Pat. No. 6,032,146 and U.S. Pat. No. 6,134,555 both to Chadra, et al. disclose an automatic dimension reduction technique applied to data mining in order to determine important and relevant attributes for data mining without the need for the expert input of a domain expert.

Being completely automatic, such a dimension reduced data mining procedure is a "black box" for most end users who rely implicitly and "blindly" on its findings.

It is our opinion that defining relevancy between objects and events is still a human act which cannot be replaced by a computer at the present time. Further more, most end users of an automatic decision making system would like to be involved in this decision making process at the conceptual level. I.e. they would like to visualize the "state of affairs" between factors which affect the final decision. They would even like to contribute to the algorithm of data mining by suggesting influential attributes and "cause and effect" relationships according to their own understanding.

Thus, we consider the expert(s) input to route and navigate the data mining according to a human knowledge and perception schemes as beneficial, provided it enables the processing of large datasets.

There is therefore a need in the art for an improved method and tool in data mining of large datasets which includes an a priori qualitative modeling of the system in hand and which will enable the automatic use of the quantitative relations disclosed by a dimension reduced data mining in automatic decision-making.

SUMMARY OF THE INVENTION

The present invention allows the automated coupling between the stages of data mining and score prediction in an automatic decision-making system.

The present invention discloses an innovative method referred to herein as Knowledge-Tree (KT), of conceptualizing any sequence of relations among objects, where those relations are not detectable by current methods of knowledge engineering and wherein such a conceptualization is used to reduce the dimension of data mining which is a requisite stage in automatic decision-making.

The KT enables automatic creation of meaningful connections and relations between objects, when only general knowledge exists about the involved objects.

The KT is especially beneficial when a large base of data exists where other tools fail to depict the correct relations between the participating objects.

In accordance with the present invention there is provided a method for automated decision-making by a computer comprising the steps of: (a) modeling of relations between plurality of objects, each object among the plurality of objects having at least one outcome and is subjected to at least one influential factor affecting the at least one outcome; (b) data mining in datasets associated with the modeled relations between the at least one outcome and the at least one influential factor of at least one object among the plurality of objects; (c) building a quantitative model to predict a score for the at least one outcome, and (d) making a decision according to the score of the at least one outcome of the at least one object.

In accordance with the present invention there is provided a knowledge engineering tool for describing relationship pattern between plurality of objects comprising a graphical symbolization of the objects and their assumed relations, the graphical symbolization including at least one interconnection cell which represents a component of a system whose the relationship pattern being described by the knowledge engineering tool.

In accordance with the present invention there is provided a computer usable medium having a computer readable program code, the program code uses a graphical representation of a Knowledge-Tree map to generate a knowledge base in a data storage region of a computer.

In accordance with the present invention there is provided an automatic decision-making system comprising: (a) a data mining tool to correlate between an outcome and a possible influential factor on the outcome; (b) a Knowledge-Tree based mechanism to reduce dimension of the data mining; (c) an empirical modeler to predict a score of the outcome and, (d) a decision making tool in accordance to the score.

Other objects and benefits of the invention will become apparent upon reading the following description taken in conjunction with the accompanying drawings.

BRIEF DESCRIPTION OF THE DRAWINGS

The invention herein described, by the way of examples only with reference to the accompanying drawings, wherein:

FIG. 10 shows a stage in a given process with all of the various types of relationship that the stage participates in.

FIG. 12 shows a plurality of interconnection cells mutually connected with all of the various types of relationship that the stages participate in.

DETAILED EMBODIMENT OF THE INVENTION

The present embodiments herein are not intended to be exhaustive and to limit in any way the scope of the invention, rather they are used as examples for the clarification of the invention and for enabling of others skilled in the art to utilize its teaching.

The invention is best explained in conjunction with U.S. patent application Ser. No. 09/588,681 which describes a knowledge-engineering protocol-suit, which is a generic learning and thinking system, which performs automatic decision-making needed to run a process control task.

The system described U.S. patent application Ser. No. 09/588,681 has a three-tier structure consisting of an Automated Decision Maker (ADM), a Process Output Empirical Modeler (POEM) and a Knowledge-Tree (KT).

A schematic partial layout of a structure of a protocol-suite of U.S. patent application Ser. No. 09/588,681 is shown in FIG. 1 to which reference is now made.

Figure 1:
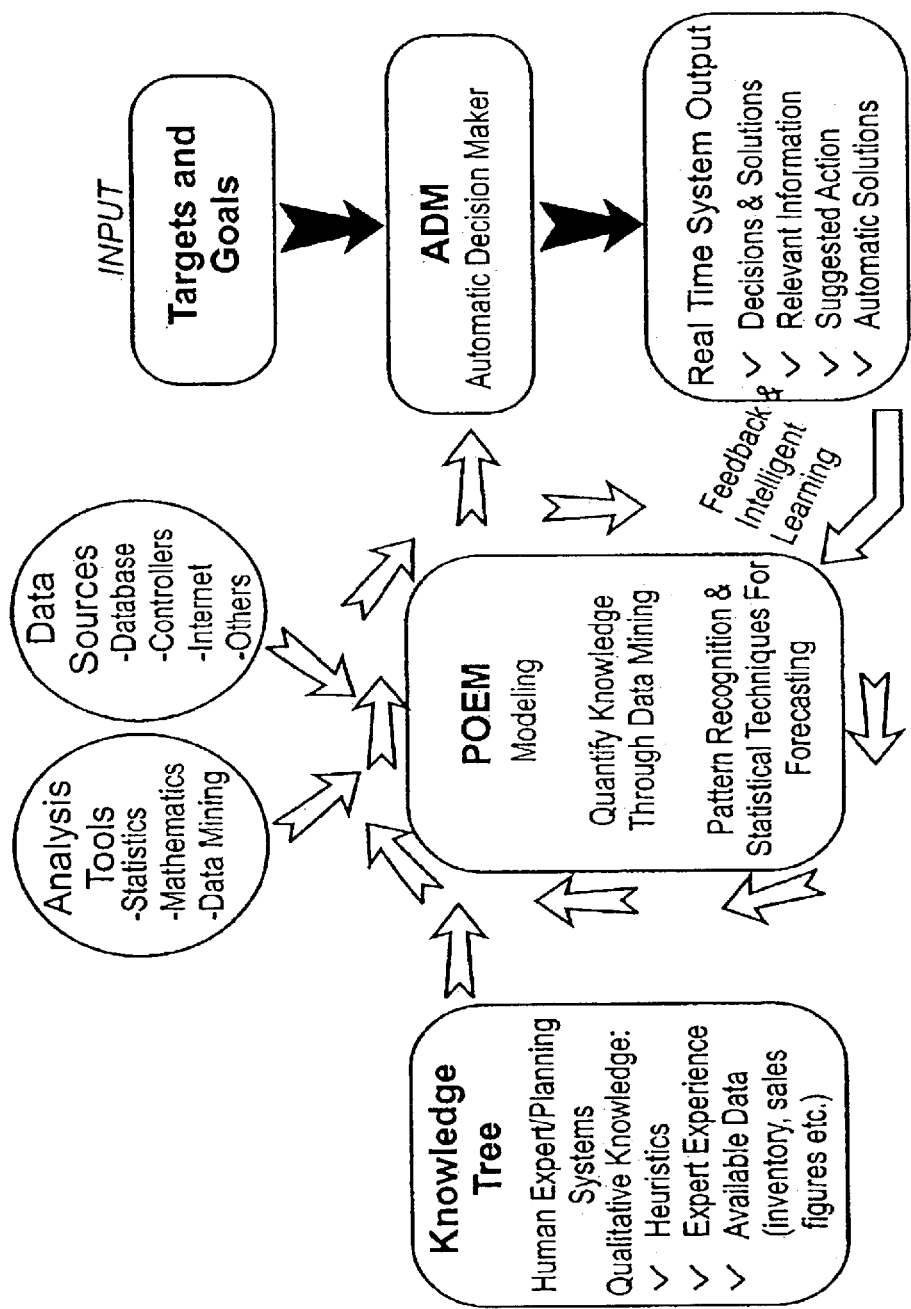
FIG. 1 depicts a structure of an automatic decision making system, which includes a Knowledge-Tree.

In FIG. 1, The KT is the qualitative and fundamental component of a protocol system that integrates physical knowledge and logical understanding into a homogeneic knowledge structure in the form of a process map known as a Knowledge-Tree map, according to which the POEM algorithmic approach that was described in the POEM Application, is applied.

The KT map which is described below in great detail, is a graphical representation of the relations between attributes of a plurality of objects in an observed or controlled system in terms of causes and their effects. I.e., it is the knowledge tree map which defines the attributes of certain objects which influence the attribute of other objects that in turn may affect the score value of the parameter which in regard to which the automatic decision is made.

It is now clear that the construction of the Knowledge Tree precedes the application of the data mining (designated as POEM in FIG. 1) and reduces the amount of the data mining by routing it in such a way as to lookup for relations among predetermined relevant datasets only.

We would like to consider this variation of data mining more as "data drilling"; in analogy to crude oil search after a geological survey, rather than strip mining the whole data mountain, which is associated with conventional data mining.

Once a quantitative model is established, it is possible to utilize its predictive power in order to construct a decision tree in accordance to a score of an attribute of a final object in the sequence of related objects.

The point to notice is that once the KT for a specific project is established, no more human intervention intercepts the next stages of the automatic decision-making process.

Figure 2B:
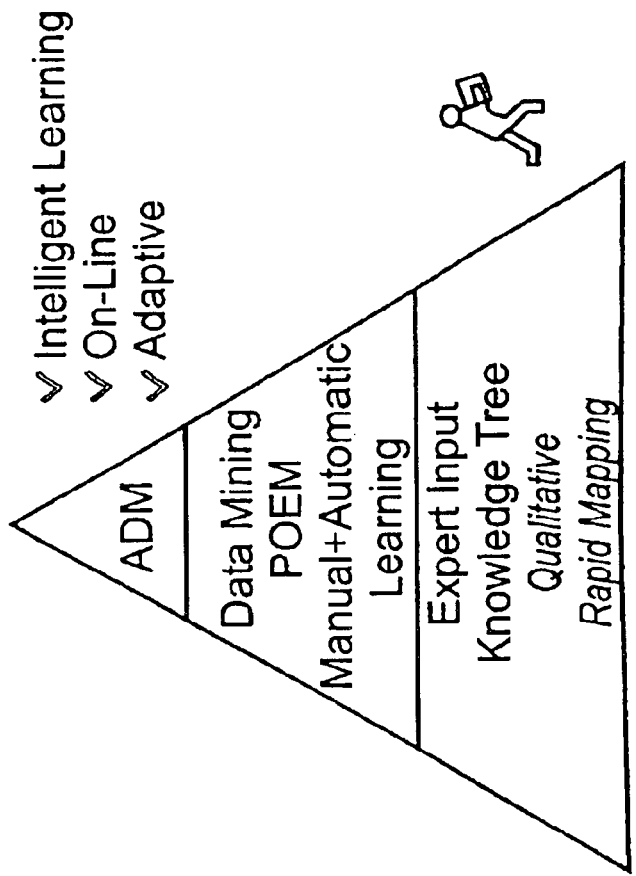
FIGS. 2A and 2B depict technology for automatic decision-making and the technology for automatic decision-making according to the present invention respectively.
Figure 2A:
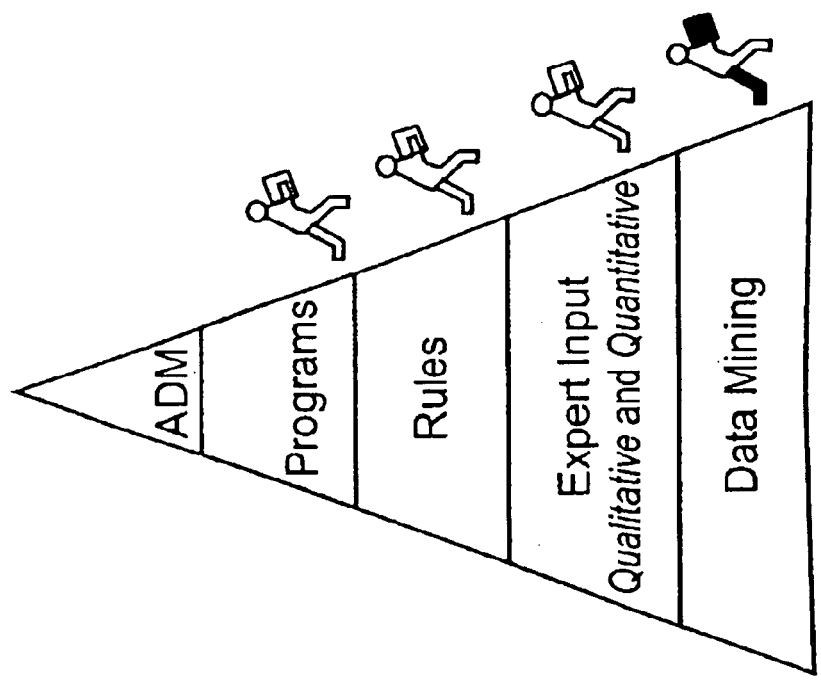

The difference between automated decision-making according to prior art in comparison to that according to the present invention is shown in FIGS. 2A and 2B.

According to prior art shown in FIG. 2A automatic data mining is intercepted by expert input, which is, as was explained before, indispensable in the assessment of the correlations which were revealed by the data mining.

According to the present invention shown in FIG. 2B, relevant relations are defined first and represented in a Knowledge Tree map and only datasets, which are associated with the respective relevant relations, are statistically analyzed.

It should now be appreciated that the present invention has two main aspects:

The method of construction of a knowledge tool called a Knowledge-Tree map and the use of the tool to enable automated decision-making.

As for the first aspect: The construction of a KT is by no means a trivial task because knowledge acquiring, perception and representation are well known problems with practical and theoretical aspects.

There have been several prior disclosures regarding method and systems for extracting and organizing knowledge into meaningful or useful clusters of information in a form of some "tree like" representation.

U.S. Pat. No. 5,325,466 to Kornacker describes the building of a system, which iteratively partitions a database of case records into a "Knowledge-Tree" which consists of conceptually meaningful clusters.

U.S. Pat. No. 5,546,507 to Staub describes a method and apparatus for generating a knowledge base by using a graphical programming environment to create a logical tree from which such a knowledge base may be generated.

U.S. Pat. No. 4,970,658 to Durbin, et al. describes a knowledge engineering tool for building an expert system, which includes a knowledge base containing "if-then" rules.

In the internet literature: A qualitative model of reasoning in the form of a "thinking state diagram" (http://www.cogsys.co.uk/cake/CAKE.htm) and visual specification of knowledge bases (http://www.csa.ru/Inst/gorb$_{13}$ dep/artific/IA/ben-last.htm) have been recently introduced.

A general picture emerging from the above mentioned prior art is that no sufficient appreciation was paid to the systematic theoretical elaboration and automatic implementation of what may be called the computerized qualitative modeling of "state of relations" between entities or events which are part of an observed system.

This is in spite to the fact that modeling and conceptualization of the flow of events which are "independent of us", as Bettoni puts it in the article "Constructivist Foundations of Modeling—a Kantian perspective", (http://www.fnbb.ch/weknow/aqm/IJIS9808.htm), plays one of the most fundamental processes of the human mind and it is that which allows to adopt software systems to imitate human reasoning.

By the term "modeling" is meant the constructing of a model in terms of personal experiences, rather then extracting expertise from an expert.

The model itself, according to Bettoni, can be defined as a symbolic representation of objects and their relation which conforms to our epistemological way of processing knowledge, and a useful model is not such a one which reflects reality (a copy of the independent relations between objects), but a working formalization of the order which we ourselves generate in the knowledge and which fulfils the aim for which it is being used.

The building of a KT map suitable for ADM raises the following issues:

(a) How one picks up most if not all the potentially objects relevant to a certain situation and assumes the independent "short range" relations between them.

(b) How one organizes and conceptualizes the information resulting from a plurality of situations into a multilevel logical structure (building the model).

(c) How one validates the model and refines it so as to ignore "irrelevant" objects and relations thereof.

(d) How does one exploit the model to reveal unpredicted or clarify "long range" relations between objects and most importantly, (e) How is the derived model most effectively coupled to an empirical modeler (data mining tool) in an automatic decision-making system.

The present invention addresses these issues by disclosing an innovative way of conceptualizing any sequence of relations among objects and the use of the KT map, which manifests this conceptualization as an infrastructure layer for an ADM.

As will become evident below in reading the detailed description of the invention, this innovative method of modeling, which is referred hereinafter as constructing a Knowledge-Tree, expands beyond commonly used computational methods of information acquiring and analysis which are followed by decision-making that are currently known as Expert systems.

Expert Systems software simulates the querying and decision-making process of an expert in a given field of expertise, analyzing information through the accumulation of a class of governing rules based on the opinions of one or more experts in that field.

However, the Expert Systems method is inherently prone to limitation due to its non-systematic and human-dependent approach. This limitation can be understood in terms of resolution. The extent to which an Expert Systems application can delve into a problem is the fixed resolution of that application. The resolution cannot be lowered, meaning that the application is not capable of solving problems of a less specific nature than that of the accumulated class of governing rules. Nor can the resolution be raised, meaning that the application is not capable of solving problems of a more specific nature than that of the accumulated class of governing rules. This problematic aspect of fixed resolution does not exist in Knowledge-Tree. Knowledge-Tree can be applied at any level of resolution, meaning that Knowledge-Tree can serve as a problem-solving tool for problems of any level of complexity for a given discipline. The resolution of analysis is defined by the user according to his needs and can be changed at will.

Another problematic aspect of the Expert Systems method is that it is prone to contradiction due to the fact that more than one expert opinion is usually used when accumulating the class of governing rules. Opinions of different experts can contradict each other, and there are not sufficient means available within the Expert Systems methodology for determining which opinion is correct other than time-consuming trial and error. Knowledge-Tree, on the other hand, is not based on the collection of a governing set of rules, and because the other software tools use the logical, validated process relationships provided by Knowledge-Tree for a strict mathematical prediction of an outcome for a given chain of events or factors, there is no possibility of inherent contradiction as there is with Expert Systems. With Knowledge-Tree, expert opinions are used to determine what are the possible influences on a given chain of events or factors; however, there is no presentation of a decision-making process and there is no collection of governing rules.

The present invention comprises a method, a tool and system for the modeling of relations between objects. It includes processes of integrating of acquired physical knowledge and its subjective logical interpretation in terms of "influences" and "outcomes" into a knowledge structure, which is represented graphically by a relationship pattern called a Knowledge-Tree map.

The resulting Knowledge-Tree map is substantially a "cause and effect" map among objects. Hereinafter an object is defined as a material or an intangible entity, (e.g. overdraft, wafer, health) or an event, (e.g. polishing). An object is characterized by at least one state or an outcome, which is neither a "physical" state, nor some property of it. Rather it is merely an attribute, which represents whether according to our perception, the object influences in any relevant way some other object.

A relation is defined as any assumed dependency of the state or outcome of an object on the outcome or state of another object.

Figure 3:
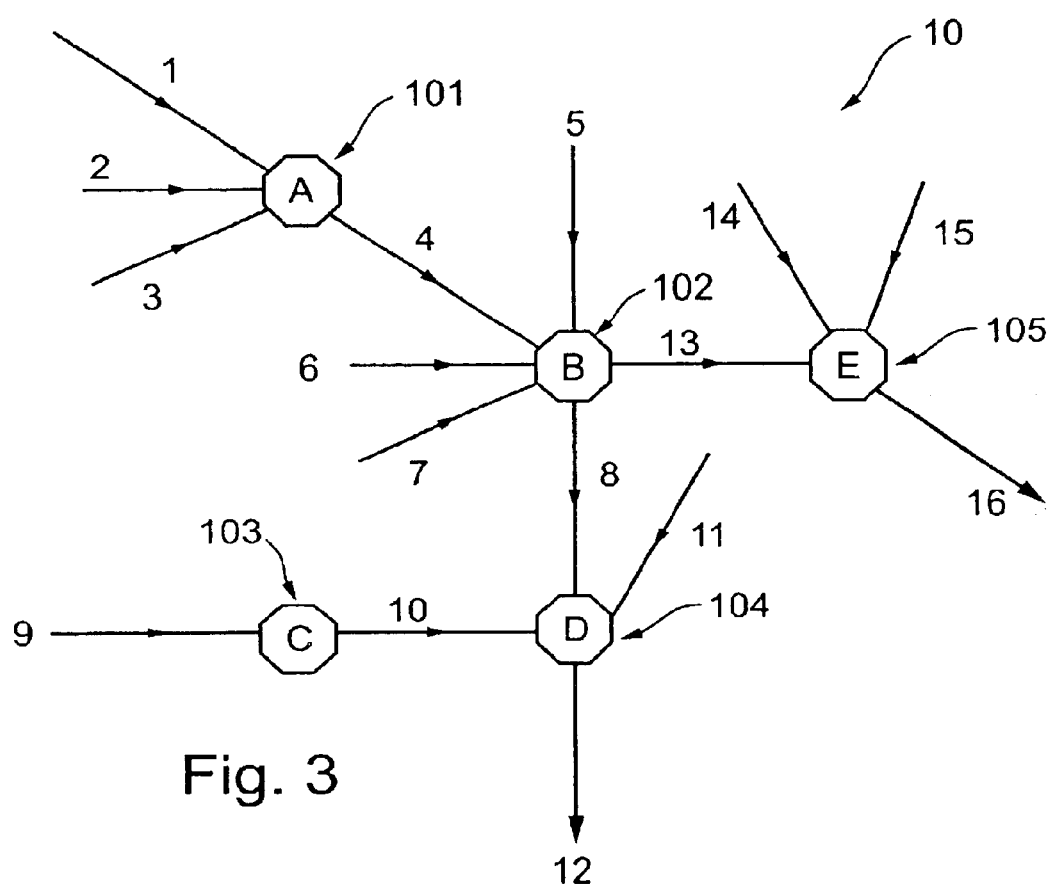
FIG. 3. depicts a general sample of a Knowledge-Tree map.

A scheme of a Knowledge-Tree 10 for a general plurality of objects and their relations is shown in FIG. 3. In FIG. 3, each object is represented by a node, thus the five nodes labeled A 101, B 102, C 103, D 104, and E 105 represent five different object.

A state or an outcome of an object is designated by a pointer (an arrow), which originates from this object, while any alleged influence on the state or outcome of an object is designated by a pointer pointing toward that object.

The incoming pointers define routes of data streams which are relevant to the outcome of each object. I.e. only data in datasets which are associated with the pointers are experimentally acquired (or extracted from a data-base) and processed by a quantitative modeler to yield quantified functional relations between the objects in problem at hand.

In FIG. 3 each object produces at least one outcome. Objects A 101, B 102, and C 103 produce outcomes that influence other objects. Arrows 1–11 and 13–15 represent influences that affect an object, and arrows 12 and 16 represent final outcomes at nodes D 104 and E 105 respectively. Arrows 4, 8, 10, and 13 represent intermediary outcomes of objects that are influences on other objects. That is, the object at node A 101 produces an intermediary outcome (arrow 4) that is an influencing factor on the object at node B 102, the object at node C 103 produces an intermediary outcome (arrow 10) that is an influencing factor on the object at node D 104 and the object at node B 102 produces two intermediary outcomes (arrows 8 and 13), where arrow 8 is an influencing factor on the object at node D 104 and arrow 13 is an influencing factor on the object at node E 105.

The Knowledge-Tree map depicted in FIG. 3 is an example only, and is not meant in any way to limit the possible number of objects in the chain of objects depicted by a Knowledge-Tree map. Nor is the map in FIG. 3 meant to limit the number of influences that can be depicted as affecting any object using a Knowledge-Tree map.

In theory, any number of influences is possible, although in practice large numbers will increase complexity. Likewise, there is no limit to the number of outcomes that can be depicted as resulting from an object. In FIG. 3, object B 102 produces two outcomes, and all the other objects produce only one outcome.

The uniqueness of the Knowledge-Tree map is that it allows the user to present any sort of process or chain of objects and define what he feels are the relations between the objects in that chain of objects. After experts on a certain object have defined what they perceive as the factors that may influence the state or an outcome at that object, data is collected to validate the potential influences of the suggested factors on the outcomes of the objects they allegedly affect.

Knowledge-Tree takes that data and uses mathematical, statistical or other algorithms for determining a quantitative correlation between an influential factor and the outcome of the affected object.

Influences with such high correlation are entered into the Knowledge-Tree map as relevant relations between objects.

When completed, the Knowledge-Tree map presents an entirely new conception of how to realize the relation between objects, i.e. to perceive the process or chain of objects depicted. Because Knowledge-Tree relies on the validation of the hypothesis whether a user-defined potential influence affects a particular object, Knowledge-Tree enables the user to take any number of potential influences which he thinks may in some way influence a given chain of objects, and after validation presents those influences in a logical configuration, showing upon which object in the chain each influence affects.

Prior to implementing Knowledge-Tree, these potential influences were, at best, assumed to influence this chain of objects in some way, but which object specifically in the chain was unknown. At worst, it was not clear at all whether the potential influence had any affect on this chain of objects. Further, the element of connectivity between objects allows for determining even more indirect influences on a given object.

For example in FIG. 3, Knowledge-Tree map shows that arrows 8, 10, and 11 are influences on the object at node D 104. However, since arrow 8 is also an outcome of the object at node B 102, all the influences on the object at node B 102 (arrows 4, 5, 6, and 7) are, in effect, indirect influences on the object at node D 104, and this information would have remained unknown without implementing Knowledge-Tree.

Further, because arrow 4 is also an outcome of the object at node A 101, all the influences on the object at node A are indirect influences on both the object at node B 102 and the object at node D 104.

The Knowledge-Tree map greatly simplifies determination of influencing factors on a chain of objects. As a first practical example, assume that a doctor needs to prescribe different types of medications to treat a patient who suffers from high blood pressure, diabetes, and a heart condition. The doctor needs to prescribe three different drugs for the high blood pressure, one drug (insulin) for the diabetes, and three different drugs for the heart condition. In addition, when prescribing insulin for diabetes, the doctor must also take into account the patient's physical activity.

The number of medications and other influences in this situation make determining an accurate diagnosis for this patient complicated.

While the doctor's experience and expertise certainly allow him to make a professional diagnosis, applying Knowledge-Tree to such a situation improves upon the accuracy and reliability of this diagnosis.

Figure 4:
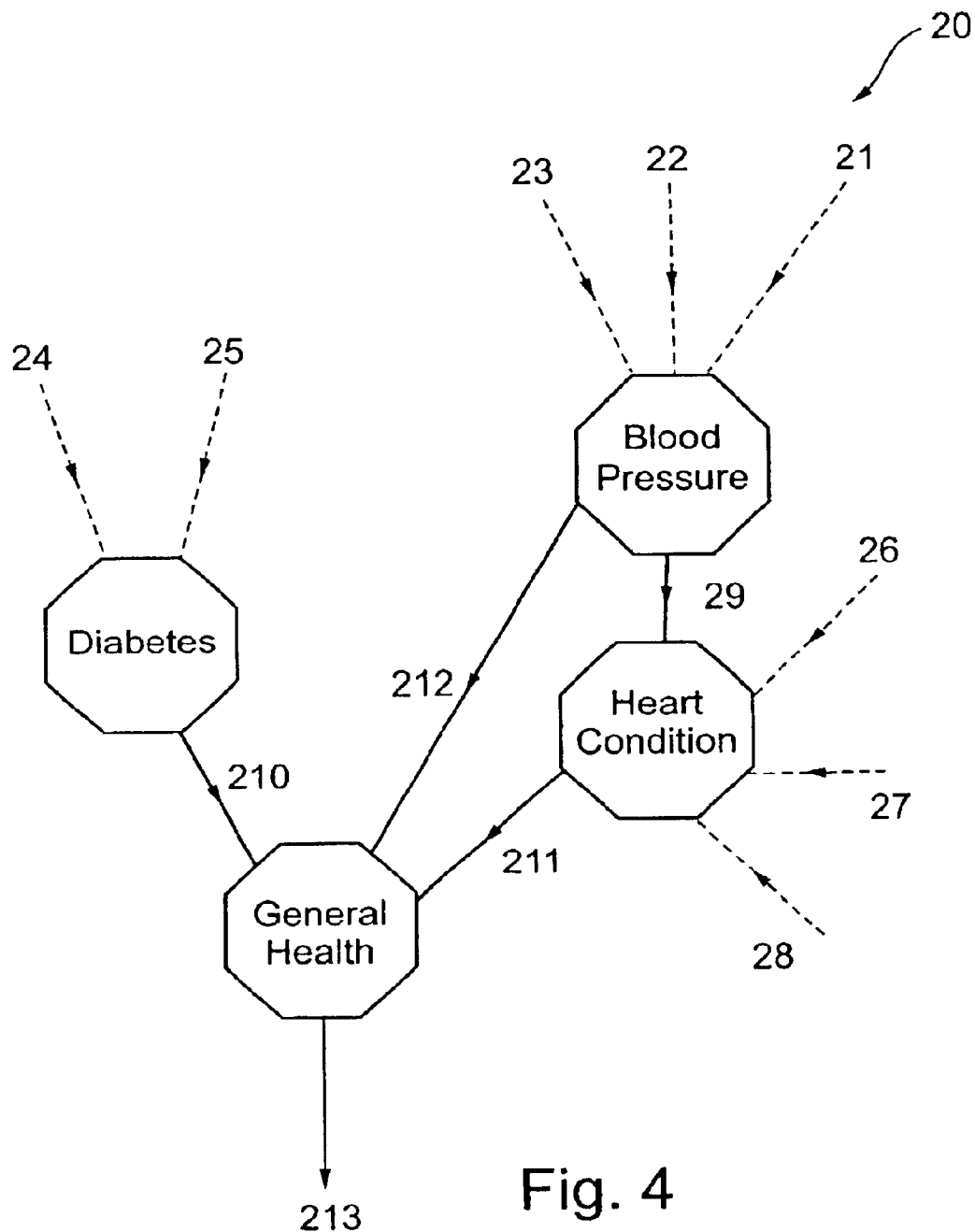
FIG. 4 shows a Knowledge-Tree map useful in medical diagnosis.

FIG. 4 shows a Knowledge-Tree map 20 for such a situation. Arrows 21, 22, and 23 represent the influence of each of the respective three medications for the high blood pressure, arrow 24 represents the influence of various amount of insulin, and arrow 25 represents the patient's physical activity on the diabetes.

Arrows 26, 27 and 28 represent the influence of each of the respective three medications for the heart condition. Arrow 29 represents the influence of the patient's blood pressure on his heart condition; arrow 210 represents effect of the patient's blood sugar level on his general health; arrow 211 represents the effect which the patient's heart condition have on his general health, and arrow 212 represents the effect of the patient's blood pressure on his general health.

Arrow 213 is the outcome the patient's general health, which is also the final output of this Knowledge-Tree map.

With a Knowledge-Tree map of this type, the doctor can now make a more precise diagnosis for this patient. Other existing software tools will analyze data relating to the amount and types of drugs and the results which they produce.

For physical activity 25, which is an influence that does not inherently lend itself to being measured, units of measurement are devised based on such criteria as the type of activity and the length of time over which it is performed. Similarly, for the influence that the patient's heart condition has on his general strength, represented by arrow 211, units of measurement will are devised based on the patient's heart history, such as the number and severity of heart attacks, the number of times the patients has been hospitalized for heart problems and the length of stays in hospitals, and so forth. Finally, units of measurement are devised for categorizing the patient's general health, based on criteria such as the number of annual doctor visits, the number of times a patient has been hospitalized during the past year, length of stays in hospitals, and so forth.

After applying Knowledge-Tree to this patient's situation, the doctor is able to provide a much more precise diagnosis suited to the physical condition of the patient. Without Knowledge-Tree, the doctor will make his diagnosis based on his experience and expertise. Although the doctor's experience and expertise should not be invalidated, in the face of such a large number of influences, it is impossible to attain the level of accuracy that Knowledge-Tree provides using experience and expertise alone.

Figure 5:
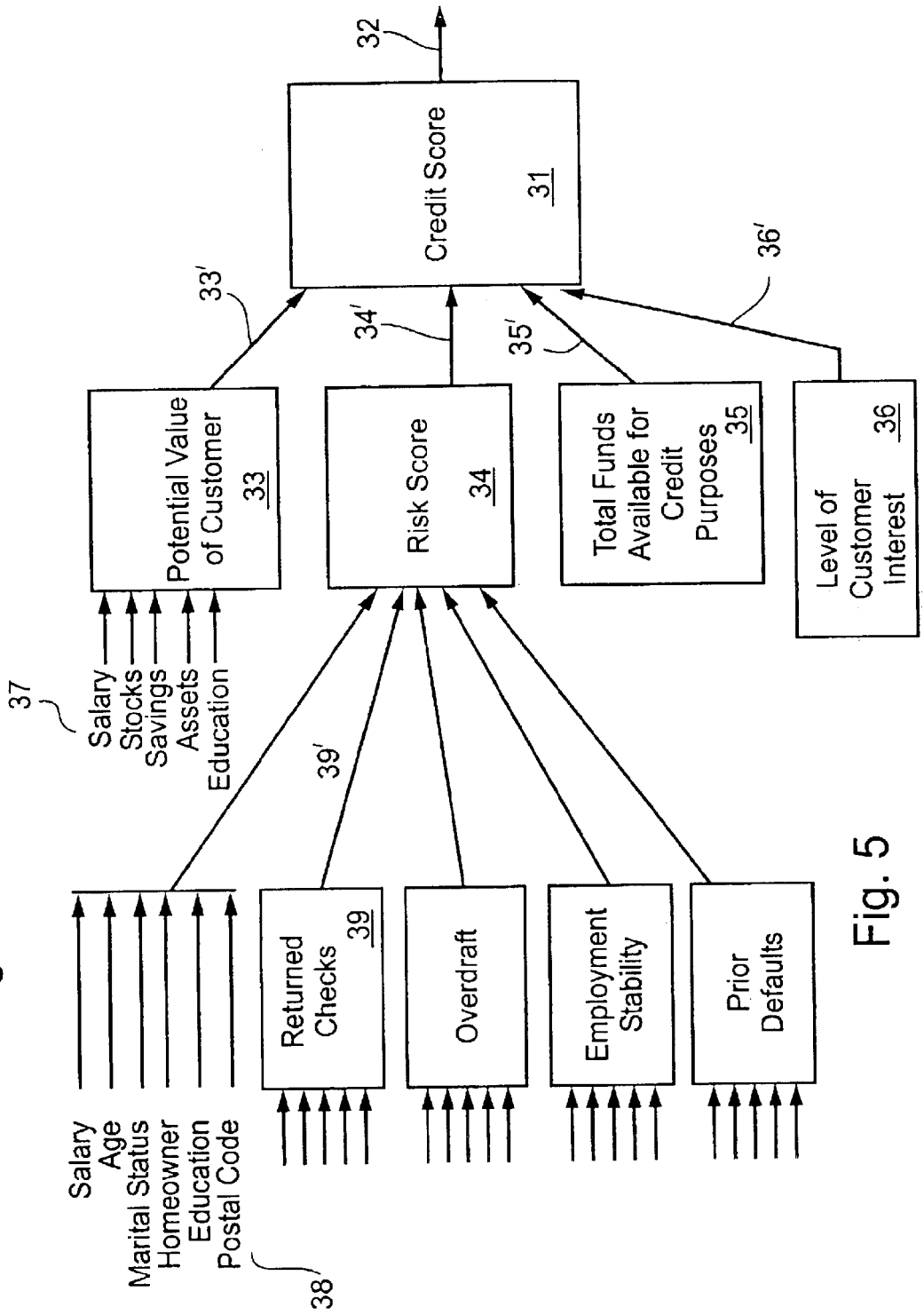
FIG. 5 shows a Knowledge-Tree map for building a credit score.

A third embodiment 30 for constructing of a KT map useful in business, and which is of help in explaining some aspects of the invention is shown in FIG. 5 which shows a KT map useful in establishing a credit score.

The goal of the model represented by the KT map in FIG. 5 is to show objects and relations thereof, which are relevant to an automatic processing of a customer application to a bank for a loan. The decision is made according to an outcome 32 of the client's credit score 31 which according to a financial advisor of the bank is influenced by at least other outcomes 33'–36' of four objects 33–36 respectively.

Outcomes 33'–36' of each of the respective objects 33–36 is in turn influenced by groups of fundamental influential factors 37, 38 which according to the model are not an outcome of any object, and by outcomes of other objects e.g. outcome 39' of object 39.

How are objects selected? Firstly because they exist, e.g. as a field in case records of data-base in warehouse data which are a priori related to the problem in hand. Secondly they are formed according to an expert assessment that they should be there, i.e. that there are factors which influence other (already existing) objects related to the problem at hand.

In the second case, it may be necessary to collect from scratch (or to design experiments acquiring) raw data in regard to these objects.

Even so the objects list can be endless and their selection by the expert is arbitrary and may appear incomplete.

A related problem is the validation of assumed relations; only "short range" relations are validated, i.e. between influences and an outcome at a single object. The meaning of the term "outcome" is now widened to include a qualitative attribute (a score), which is associated with a respective outcome that results from unique combinations of influences on that object.

Consider for example in FIG. 5 the six influences of group 38 on the outcome 34' of the "Risk Score" object 34. Suppose that each one of the members of group 38' can posses one of several possibilities. I.e. there are three grades of salary; three categories of age, three categories of martial status, two possibilities as to whether a client is an home owner, three levels of education and the postal code is also differentiated into three categories. Thus there are $2 \cdot 3^5 = 1458$ distinct combinations of inputs to influence the object 34 of "Risk Score".

We divide the possible outcomes 34' of "Risk Score" 34 into e.g. four quantitative risk categories. We look for a correlation between a combination of influential factor of group 38 and the category of the outcome 34' of "Risk Score" 34.

Correlation between an influential factor and a category (or score) of an outcome is accomplished by any known statistical mechanisms e.g. those which are used in data mining such as linear regression, nearest neighbor, clustering, process output empirical modeling (POEM), classification and regression tree (CART), chi-square automatic interaction detector (CHAID), decision trees and neural network empirical modeling.

When no correlation is observed, the alleged influence on the output of the object is omitted from the KT map.

From here one may conclude that validation of a KT structure involve the same procedures as are used in data mining itself. This is indeed so, however the validation of the KT is not such a critical task as the validation of the relation suggested by the data mining, and thus can be carried out by using a limited amount of data records.

As can now be understood in addition to Knowledge-Tree being able to determine new influences on a particular object in a chain of events, the connective nature of Knowledge-Tree allows for determining an even greater number of more indirect influences on that object.

The formal procedure of forming a Knowledge-Tree is a multi step process, which may include the following steps:

(1) Establishing a uniform nomenclature for referring to each of a plurality of objects.

(2) Collecting an ensemble of template-type questioners from a plurality of 'experts' (not necessarily of homogeneous status) wherein each questionnaire allows an expert to relate to significant factors effecting performance of at least one object.

(3) Unifying each template as relating to a nomenclature recognizable node, edge, cell or aggregate thereof (contiguous or otherwise).

(4) Building a Knowledge-Tree (using known graph theoretic techniques) from the nomenclature unified templates or using a process map (if a process map exists) including new template suggested relationships from the ensemble of collected expert suggested relations.

A node that represents an object is termed in Knowledge-Tree an interconnection cell. The interconnection cell is the basic unit from which the Knowledge-Tree map is built. When the outcome of one interconnection cell is an influence on another interconnection cell, such as in the case of arrow 4 in FIG. 3, which joins nodes A 101 and B 102, the two interconnection cells are joined together.

It is this connectivity between two interconnection cells that allows for the global presentation of the Knowledge-Tree map and its use in data mining of large data-bases.

This is so because the theoretical possible number of interconnection cells can be very large and because each one of them is subjected in its turn to an identical framework of data mining software tool, which analyze the interconnection cell for purposes of predicting quantitative outcome values at that interconnection cell.

I.e. the objects are subjected to the same analysis advancing from the bottom of the tree to its top wherein the outcome of one object is an influential factor of the next interconnected object.

Thus, the incorporation of the Knowledge-Tree to conventional data mining procedures allows for a novel improved data mining technique: a dimension reduced object oriented data mining.

The interconnection cells that build the Knowledge-Tree shows all the qualitative influences on a particular output characteristic, without determining how these influences affect quantitatively the output characteristic. That is, the interconnection cell generated by Knowledge-Tree shows only which factors influence an output characteristic, but not how and to what extent. Other software tools e.g. as in the POEM Application determine the quantitative influences in the interconnection cell.

For influences that do not inherently lend themselves to being measured, units of measurement are devised based on the nature of the influence. However, the scope of Knowledge-Tree deals with determining only the qualitative, and not quantitative, influences on an output characteristic.

Applications in Process Control

A fourth embodiment of the present invention of applying Knowledge-Tree to process control is now presented, as one of the primary applications of the present invention is in the field of process control.

Simply stated, process control deals with optimizing one or more characteristics of output at a given stage in a process. That is, output at a given stage may consist of only one object. However, that object may have any number of characteristics. For example, if we examine baking bread as a process, a finished loaf of bread is considered to be the output of the process. Yet, this bread can be examined for a variety of qualities, such as weight, texture, length, crust hardness, and taste. Each one of these qualities is an output characteristic. Process control can be applied to the process of baking bread with the goal of optimizing one, some, or all of these qualities. However, process control cannot be applied to any process until it has been determined exactly which output characteristics are to be optimized.

Likewise, when examining input at a given process step in the context of process control, this input is examined according to its characteristics. For example, a process step could have one input which is a piece of wood. Yet, this wood can be analyzed in terms of its length, width, density, or other characteristics. Each one of these characteristics is a measurable input. The characteristics according to which process input and output are analyzed are ultimately determined by the specific objectives and needs of the process engineer.

Figure 6:
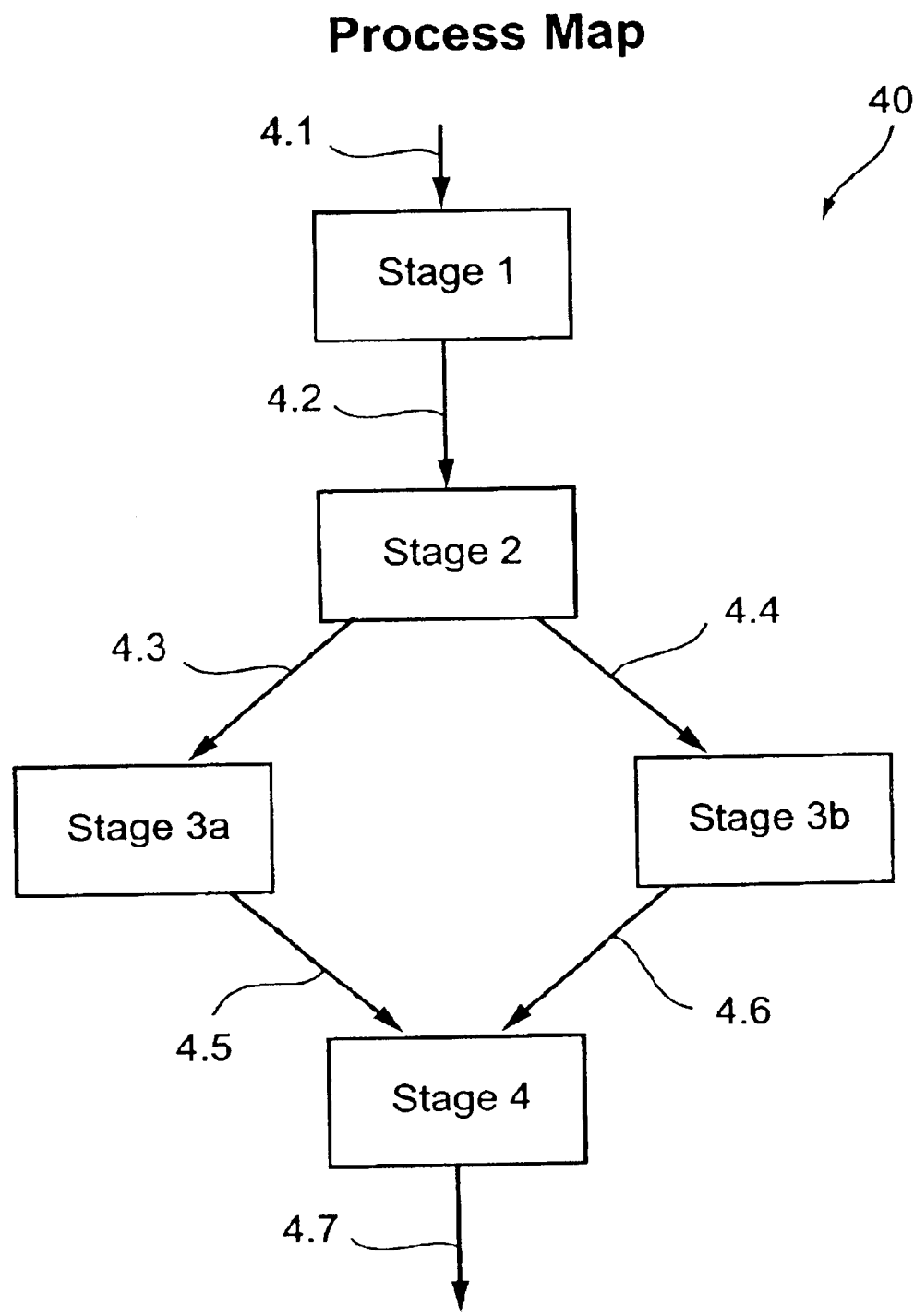
FIG. 6 shows an example of a simple process map.

Depicted in FIG. 6 is an example simple process map 40. The boxes in the diagram labeled 'Stage 1', 'Stage 2', 'Stage 3a', 'Stage 3b', and 'Stage 4' represent objects which are stages in a portion of a typical process. The arrows labeled 4.2, 4.3, 4.4, 4.5, and 4.6 represent measured output at a given process step that consist measured input to the next process step. Arrow 4.1 represents the initial measured input to the overall process. Arrow 4.7 represents measured output from Stage 4. If there is another process stage after Stage 4, the output represented by arrow 4.7 is input to that next stage. If Stage 4 is the final stage in the process, then arrow 4.7 represents the final output for the process.

Stages 3a and 3b represent parallel stages, which can run simultaneously or in an alternating manner. For example, a process would utilize such stages when an operation carried out at a stage is slower in relation to actions carried out at other stages in the process. In such a case, it is advantageous to break down the slower stage into parallel stages as seen in FIG. 6; thereby speeding up process time at that stage. Another example of when parallel stages are used would be for one process that produces two types of output. Such a process will elect which of the different operations will be carried out at the "parallel stage".

Input at a given process step that is received as output from a previous process step is considered to be a type of measurable input. In the context of the present invention, measurable input is anything that influences output at a given process step, and whose value can be measured but not controlled at that process step. This measuring is done by automated machinery or by a process engineer. Input at a given process step that is received as output from the immediately previous step is measurable input because its value was determined at the immediately previous step and cannot be controlled at the current process step, and because its value can be measured.

Therefore, an input at a process stage such as the input depicted by arrow 4.2 in FIG. 4 may consist of only one item, yet that item can be analyzed according to how any number of its characteristics affect an output characteristic. Each one of these input characteristics is therefore considered to be an independent measurable input. Arrows 4.1, 4.2, 4.3, 4.4, 4.5, and 4.6 in FIG. 6 can be understood to represent any number of measurable inputs, regardless of whether there is only one item or entity that is input at the given process step. Likewise, the output represented by arrow 4.7 can be understood to represent any number of measurable outputs, regardless of whether that output consists of only one item or entity.

Figure 7:
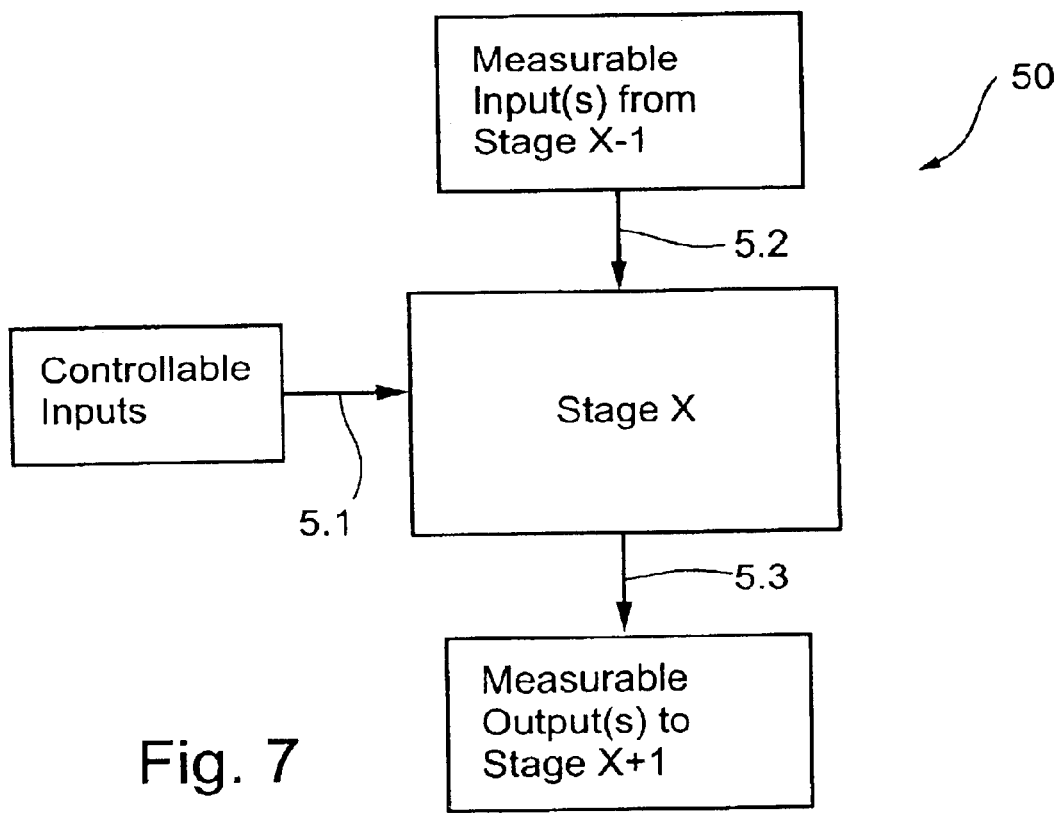
FIG. 7 shows a typical stage in the process shown in FIG. 6

Referring now to FIG. 7. Depicted is a typical stage 50 of process 40 represented in FIG. 6, referred to in FIG. 5 as 'Stage X'. Like the process steps depicted in FIG. 6, the process step depicted in FIG. 7 receives one or more measurable inputs from the previous process step (arrow 5.2), and produces one or more measurable outputs that are received by the next process step as one or more measurable inputs (arrow 5.3).

Arrow 5.1, to the left of Stage X, depicts one or more controllable inputs for the operation carried out at Stage X.

A controllable input is any input that has a direct and obvious influence on output at a given process step, and whose value can be directly controlled by a process engineer or automated machinery carrying out the operation at the given process step. Examples of controllable input include, but are not limited to, the pressure setting for an operation carried out at a given process step, the speed at which an operation is carried out, or the temperature setting for a heating operation.

For the purposes of process control, both in the context of standard process control and in the context of the present invention, it is necessary to monitor the values of controllable and measurable inputs at a given process step, and the values of output characteristics at that process step. These monitored values serve as part of the raw data used for process control. The optimization of an output characteristic at a given stage in a process that occurs in process control is carried out by determining values for one or more controllable inputs at that process stage that will yield the desired value of that output characteristic.

Figure 8:
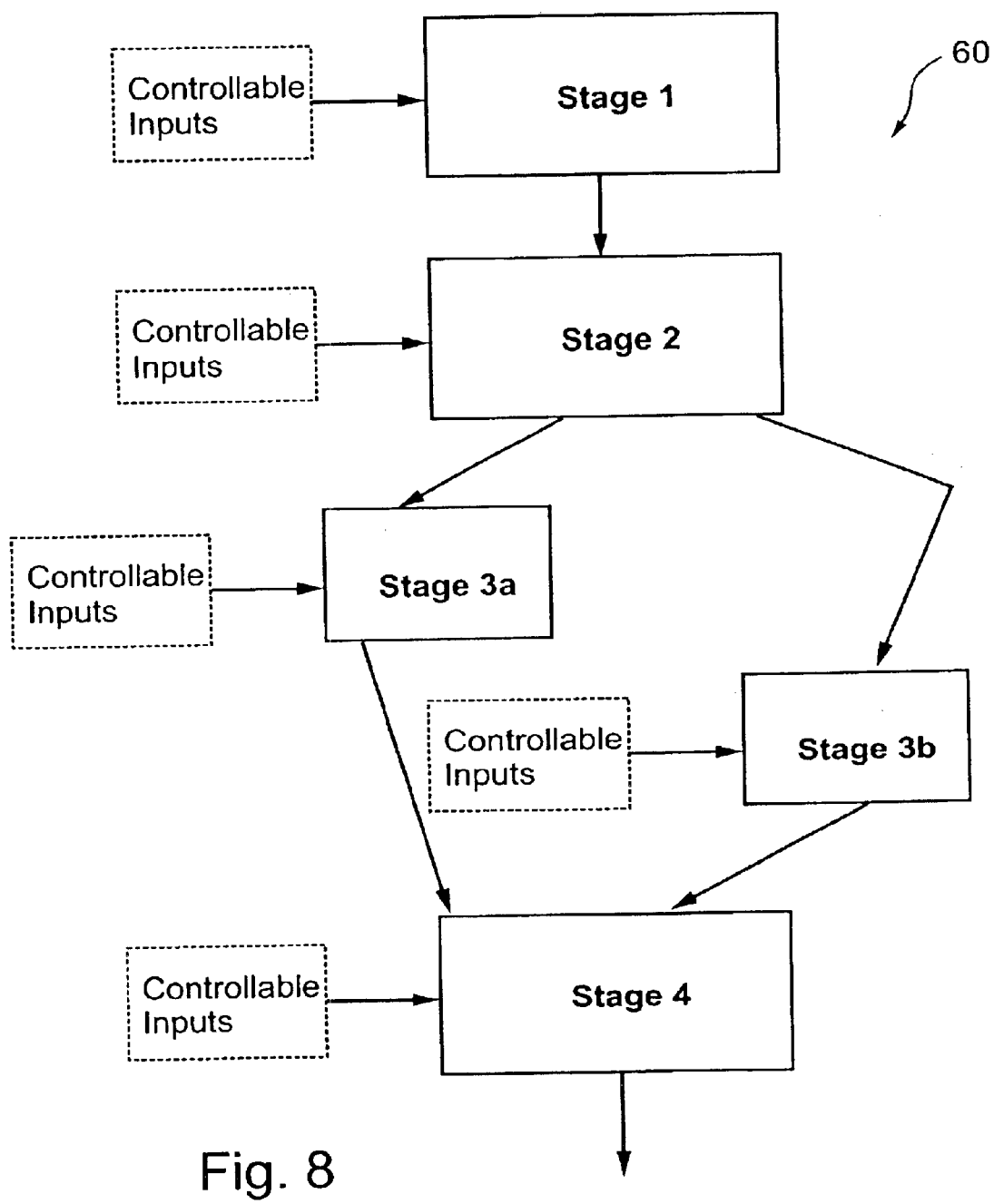
FIG. 8 shows the process map of FIG. 6 in which controllable inputs are added to various stages.

Referring to FIG. 8. Depicted is a process map 60, which is the process map 40 from FIG. 6, and now added to each stage in the process are controllable inputs.

Interrelationships and Outside Influences

Figure 9:
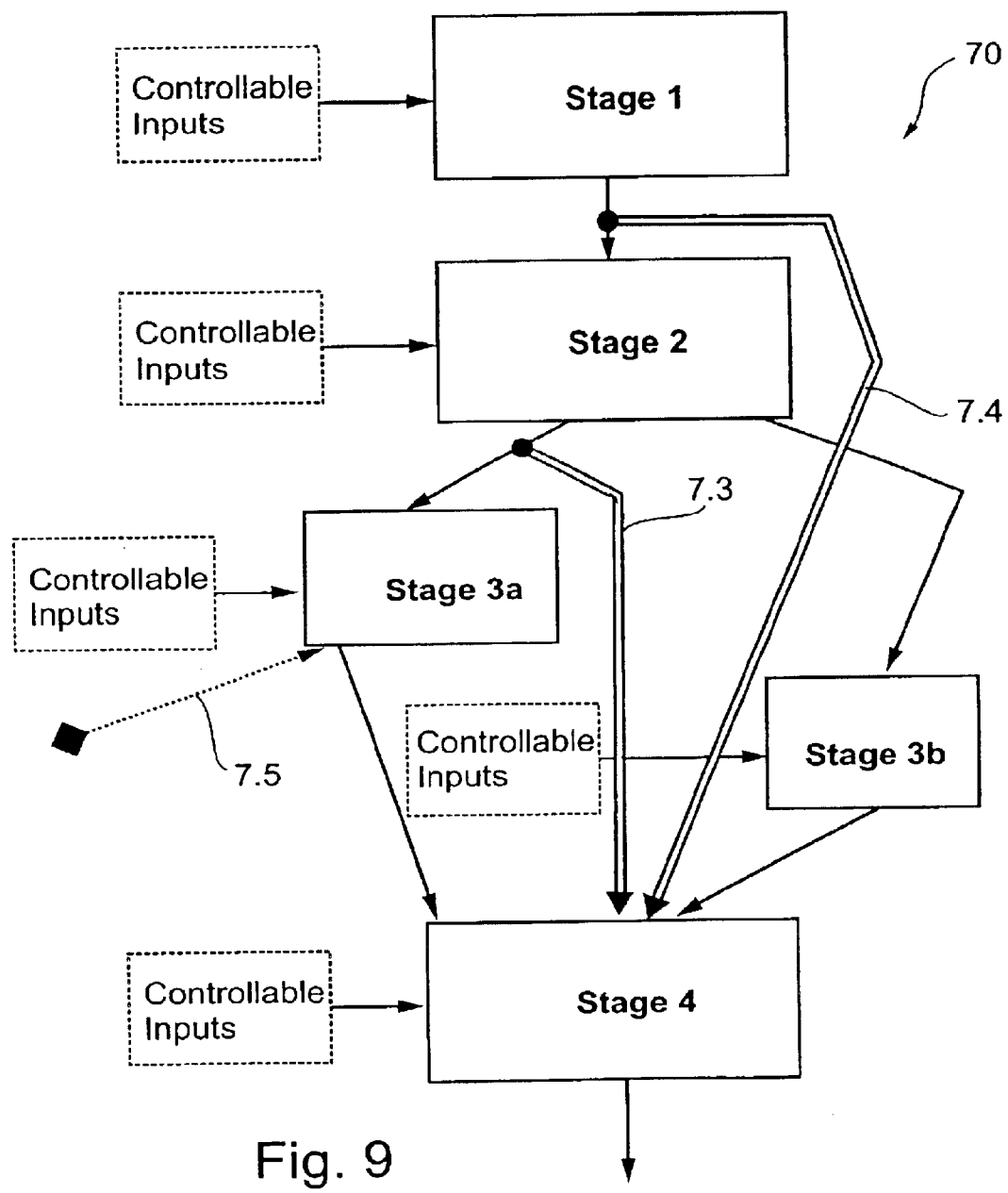
FIG. 9 shows the process map of FIG. 6 in which interrelations between stages and outer influences are indicated.

Referring now to FIG. 9. Depicted is a process map 70 which is the process map 60 from FIG. 8, to which arrows are added indicating interrelationships and outside influences at certain process steps. An interrelationship exists when there is alleged or validated information that a particular controllable or measurable input at an earlier Stage X influences in some way a characteristic of the output at a later Stage X+n (where n is any integer greater than 0). In FIG. 9, interrelationships exist between a measurable input at Stage 3a and a characteristic of the output at Stage 4 (arrow 7.3), and between a measurable input at Stage 2 and a characteristic of the output at Stage 4 (arrow 7.4). When an interrelationship is determined to have a valid influence on an output characteristic at a given stage in a process, that interrelationship is considered to be another type of measurable input at that process stage.

An outside influence exists when there is alleged or validated information that some non-obvious factor outside of the conventional realm of a process influences a characteristic of an output at a given stage in the process. Examples of outside influences include, but are not limited to, the room temperature where a process is being carried out, the last maintenance date of process machinery, the day of the week, or the age of a worker.

In FIG. 9, arrow 7.5 represents an outside influence on an output characteristic at Stage 3a. Outside influences are usually considered to be a type of measurable input, because their values can be measured but in most cases not controlled. In the event that the value of an outside influence can be controlled, such an outside influence would be considered controllable input. In the context of the present invention, the relationship that an outside influence has with the output characteristic it influences is also considered to be an interrelationship.

Figure 10:
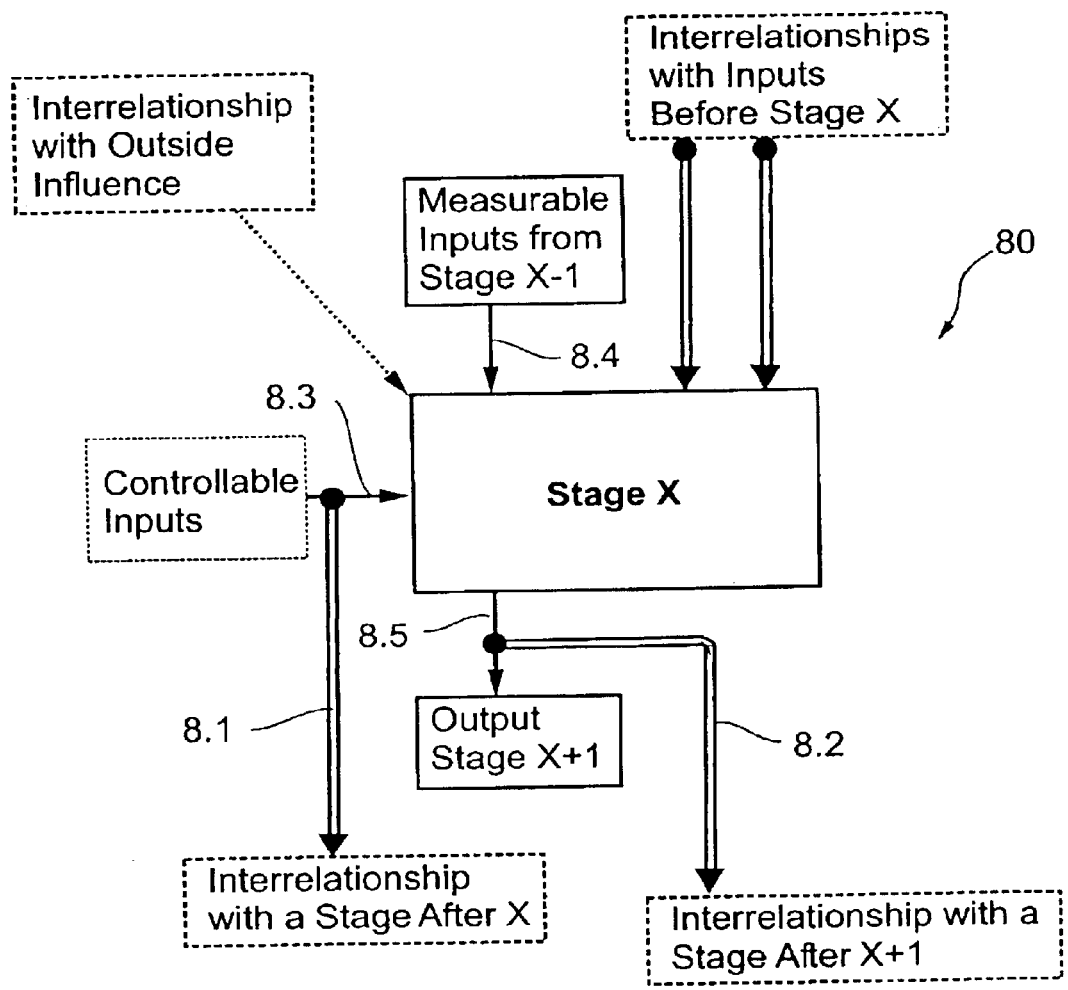

Referring to FIG. 10. Depicted is a stage in a given process 80, Stage X, with all of the various types of relevant process relationships that have been depicted in FIGS. 6–9. FIG. 10 illustrates various process control relationships that Stage X participates in, and not just those relationships that affect the output at Stage X. For example, arrow 8.1 represents an interrelationship between a controllable input at Stage X and an output characteristic at a stage after Stage X; and arrow 8.2 represents an interrelationship between an output characteristic at Stage X and an output characteristic at a stage after Stage X+1.

Standard process control focuses on determining optimal values for controllable inputs at a given process stage in order to improve the quality or quantity of output yield at that stage, where this determination is based on either the values of measurable inputs at that stage, the values of one or more output characteristics at that stage from previous runs, or a combination of the two. This can be understood as a local approach to process control, where corrections are made locally at the process stage under consideration. Referring to FIG. 10, this can be understood as determining optimal values for the controllable inputs labeled 8.3 at Stage X based on the values of the measurable inputs from Stage X−1 labeled 8.4, in order to improve the output 8.5, or based on the output measured from stage X (labeled 8.5) in the previous run.

With Knowledge-Tree, there are no a priori notions regarding predominant influences at Stage X. Knowledge-Tree allows the user to define potential non-obvious influences on an output characteristic (i.e. to define a potential interrelationship), then checks whether those interrelationships are in fact valid.

These potential interrelationships can have their source from anywhere in the process, and can even have their source from outside of the conventional realm of the process (i.e. an outside influence). As opposed to standard process control's local approach, Knowledge-Tree's orientation is a decidedly global approach where influences on output can be defined and validated from anywhere in the process.

Validation of these interrelationships is done by an algorithm that calculates a linkage such as correlation coefficient between the input or outside influence that is the source of the interrelationship and the output characteristic that it allegedly influences.

This algorithm may be any well-known and accepted algorithm for calculating a quantitative correlation between two data sets, or any algorithm which produces a substantially equivalent result. A high correlation score (i.e. a number with an absolute value close to 1 on the scale of 0 to 1) means that the interrelationship is valid and should be considered when implementing process control. Likewise, a low correlation coefficient means that the interrelationship is not valid. It is desirable in process control to consider the most valid relationships to process stages. The choice of how many and which relationships is partially determined by computational capacity and partially determined by data availability.

The Interconnection Cell in Process Control

Figure 11:
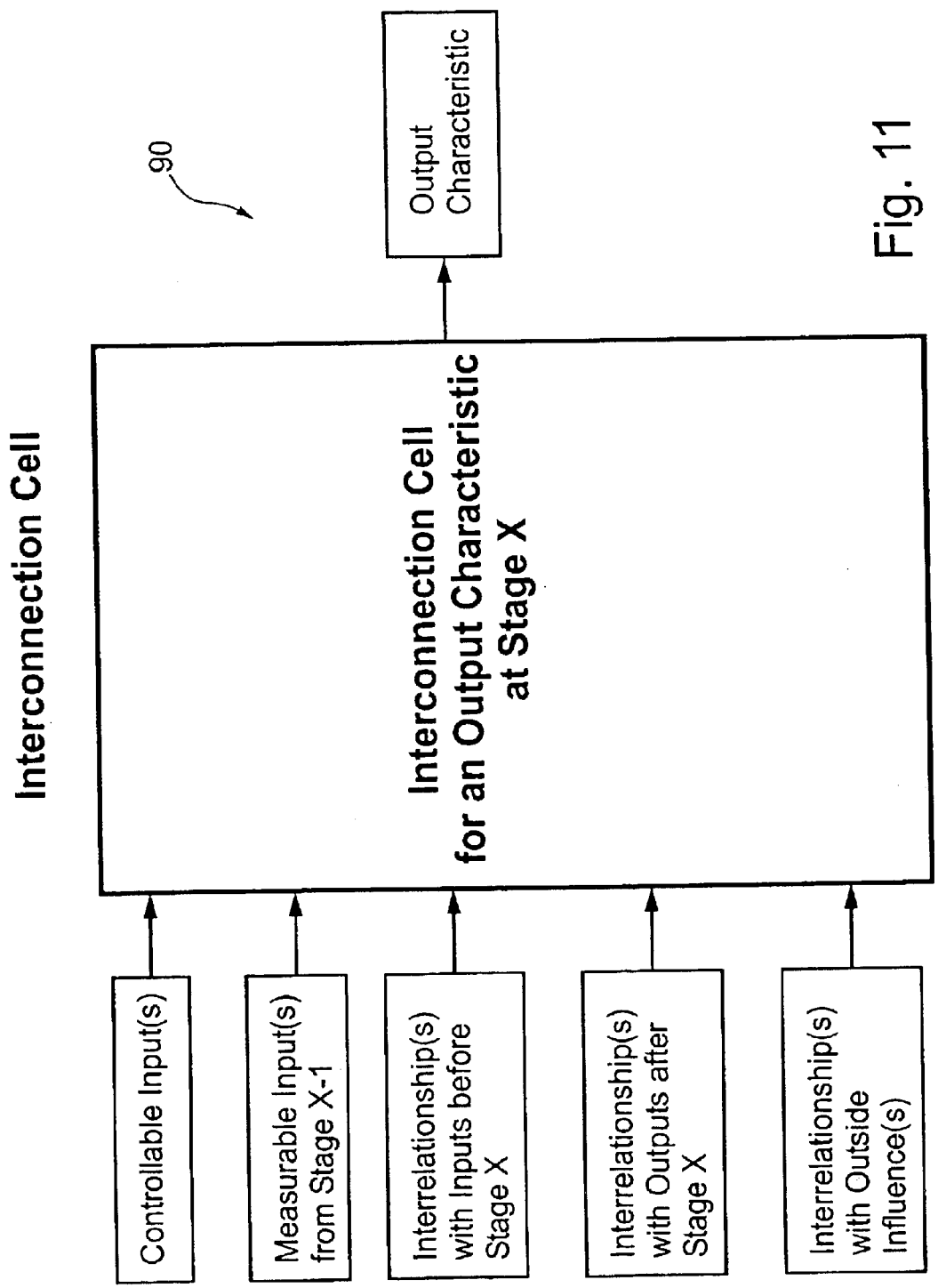
FIG. 11 shows an interconnection cell for a particular aspect of the output of a stage in a process.

After interrelationships have been validated, Knowledge-Tree presents the valid influences on a particular characteristic of the output at a given process step in terms of an interconnection cell. FIG. 11 shows an interconnection cell 90 for a particular aspect of the output at Stage X. Included in this category of valid influences on the given output characteristic at Stage X are also output characteristics at process steps after Stage X that are actually influenced by (rather than influencing) the output characteristic at Stage X. For example, assume that Knowledge-Tree is used to determine all the influences on an output characteristic $OC_X$ at Stage X. Knowing whether $OC_X$ influences other output characteristics at process steps after Stage X can be useful in determining an optimal target value for $OC_X$. It is for this reason that in FIG. 11 Interrelationship(s) with outputs after Stage X is included in the interconnection cell as an influence on the output characteristic.

In the context of process control, a given interconnection cell represents only the various influences on one particular characteristic of output at a given process step. It does not represent the process step per se. As mentioned previously, the output at a given process step can be analyzed according to any of its possible characteristics, and each output characteristic is represented by its own interconnection cell. Further, one interconnection cell does not by definition have to correspond to only one process step. In the context of process control, any group of sequential process steps comprises a process module. An interconnection cell can be defined as corresponding to a process module, where all the controllable and measurable inputs of the interconnection cell are all the controllable and measurable inputs for all the process steps in the module and the output characteristic of the interconnection cell is an output characteristic of the final step in the module.

Transforming Raw Data into Data with Logical Correspondences

After interrelationships have been defined by the user and validated by Knowledge-Tree, those interrelationships are used by other software tools as described in the POEM application to determine the quantitative relationship between the given output characteristic and the factors that have been determined to influence that output characteristic. Applying Knowledge-Tree in this manner is considered to be one of its more innovative and useful applications. The ability to apply Knowledge-Tree in this manner essentially enables presenting the original raw data with quantitative relationships between data of a given output characteristic and data of the various types of inputs and interrelationships that influence that output characteristic. Without the use of Knowledge-Tree, those quantitative 'cause and effect' relationships between the output characteristic and those interrelationships determined to affect it would have remained otherwise undetected; and certain portions of the original data which are now presented according to logical 'cause and effect' relationships would have otherwise remained as seemingly unrelated data and of no use for process control.

Figure 12:
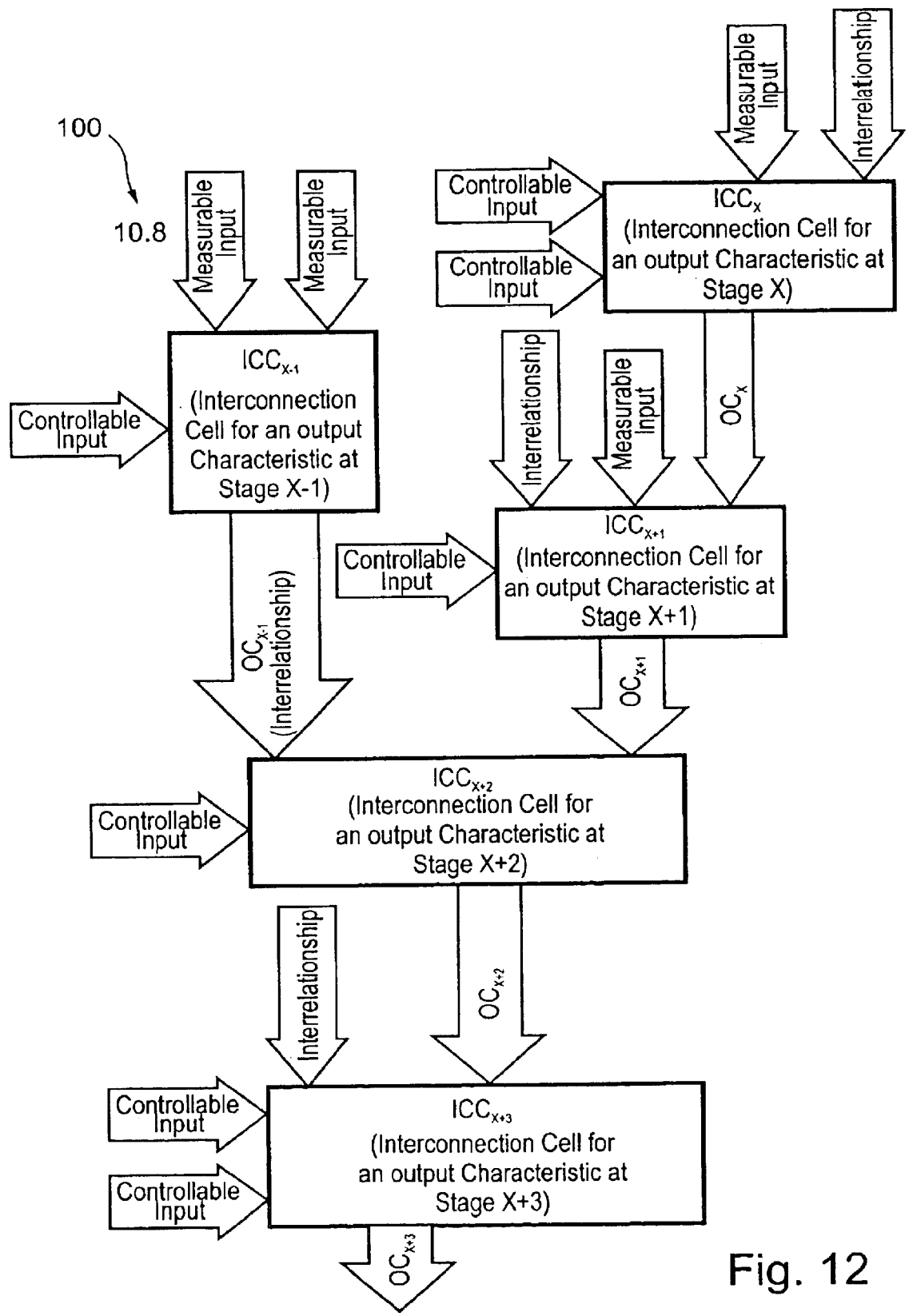

In the preferred embodiment of the present invention, a group of interconnection cells are joined together to form a Knowledge-Tree. In the context of process control, two interconnection cells are joined together when the output characteristic of one interconnection cell is a measurable input to another interconnection cell. For example, two interconnection cells labeled $ICC_x$ and $ICC_{x+1}$ are depicted in FIG. 12 to which reference is now made. $ICC_x$ is an interconnection cell for an output characteristic labeled $OC_x$ at Stage X in a given process, and $ICC_{x+1}$ is an interconnection cell for an output characteristic $OC_{x+1}$ at Stage X+1 in that same given process. The output characteristic $OC_x$ at interconnection cell $ICC_x$ is also a measurable input at interconnection cell $ICC_{x+1}$, and these two interconnection cells are considered to be joined together.

It follows that for any given process, the number of possible Knowledge-Tree characteristics at each step. Further, it is clear that a given Knowledge-Tree configuration for a process is not a process map. A process map depicts all the process steps and the flow of input and output from each step in the process to the next step in the process. A Knowledge-Tree for a given process focuses only on those output characteristics deemed important by the process engineer for purposes of process control. Further, Knowledge-Tree's mapping of interconnection cells need not necessarily correspond to all the steps in a process, nor is this mapping of interconnection cells bound to the sequential order of the process. For example, in FIG. 12, an interrelationship exists between output characteristic $OC_{x-1}$ at interconnection cell $ICC_{x-1}$ and output characteristic $OC_{x+2}$ at interconnection cell $ICC_{x+2}$. Interconnection cell $ICC_{x-1}$ is shown as directly preceding interconnection cell $ICC_{x+2}$, even though the process steps that these two interconnection cells correspond to are not adjacent.

Using the Knowledge-Tree Map for Troubleshooting Process Output

The Knowledge-Tree map enables an entirely new approach to troubleshooting process output. For example, referring again to FIG. 12 in which a section of a Knowledge-Tree map 100 is shown, assume that there is a specification range for output characteristic $OC_{x+3}$ at interconnection cell $ICC_{x+3}$, and that in recent process runs the values received for $OC_{x+3}$ have been out of that specification range. According to standard methods of process control, in order to bring the value for $OC_{x+3}$ back into the specification range, corrections should be made to one or both of the controllable inputs at the process step corresponding to $ICC_{x+3}$. According to the Knowledge-Tree map in FIG. 12, $OC_{x+2}$ is the output characteristic for interconnection cell $ICC_{x+2}$ and is a measurable input for interconnection cell $ICC_{x+3}$. Therefore, changes in the value of $OC_{x+2}$ will affect the value of $OC_{x+3}$. Of course, $OC_{x+2}$ is a measurable input and its value cannot be directly controlled in the same manner as a controllable input. However, the Knowledge-Tree in FIG. 12 reveals various possible means of indirectly changing the value of $OC_{x+2}$. The most obvious is to affect a change on the value of $OC_{x+2}$ with the controllable input labeled 10.5 at interconnection cell $ICC_{x+2}$.

Another possible means of affecting a change on $OC_{x+2}$, and one that really only becomes clear through applying Knowledge-Tree, is to try to affect a change on the output characteristic $OC_{x-1}$, which according to the Knowledge-Tree in FIG. 12 has been determined to have an interrelationship with output characteristic $OC_{x+2}$ at interconnection cell $ICC_{x+2}$. $OC_{x-1}$ is the output characteristic for the process step X-1, which is three steps prior to process step X+2. Yet, Knowledge-Tree has determined that there is an interrelationship between $OC_{x-1}$ and $OC_{x+2}$. Therefore, affecting a change on $OC_{x-1}$ will in turn affect $OC_{x+2}$, which in turn will affect $OC_{x+3}$. Again, there are various options for changing the value of $OC_{x-1}$, the most direct being to adjust the value of the controllable input labeled 10.7 at interconnection cell $ICC_{x-1}$, and depending on the actual number of process steps preceding step X-1, there could be a wide variety of even more options.

However, it should be clear from this example that by using Knowledge-Tree in this manner and backtracking in the Knowledge-Tree map according to input/output connections and interrelationships, it is possible to locate influences on process output that would likely not have been detectable according to standard means of process control. It may be the case that backtracking in this manner may not necessarily be the most effective means of improving output characteristic values; but it is also possible that by using Knowledge-Tree in this manner detection of new influences, which were heretofore unknown, will allow for easier and/or more cost-efficient means of improving an output characteristic.

Use of Knowledge-Tree in Microelectronic IC manufacturing

Figure 13:
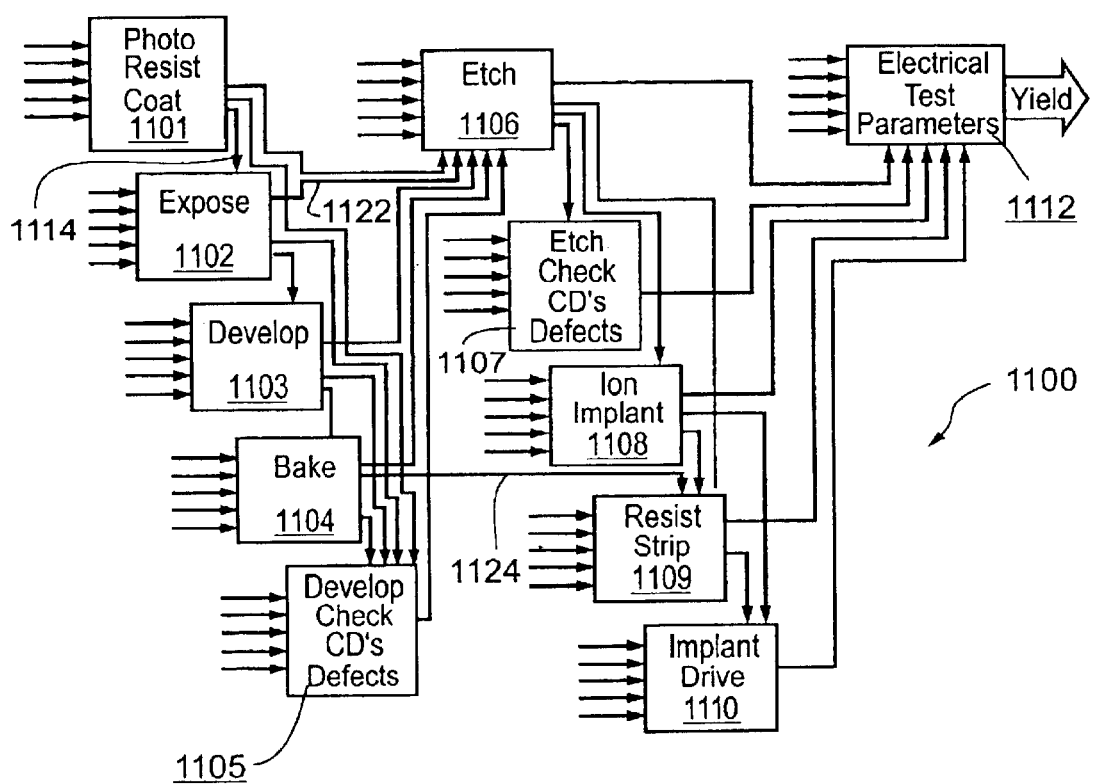
FIG. 13 shows a Knowledge-Tree map useful in microelectronic fabrication processes.

FIG. 13 shows a Knowledge-Tree map 1110 which includes some of the steps which are used in the microelectronic industry in the production of a solid state device, that the testing 1112 of its electrical parameters is the final stage of the manufacturing process.

Knowledge-Tree map 1110 contains interconnection cells referenced 1101–1112, which are actual steps in the manufacturing process as known in the prevailing microelectronic manufacturing art.

There are further linkages represented by arrows, these linkages are based upon various factors as described in the following:

Linkages between interconnection cells which are based on consecutive steps in the manufacturing process wherein a second stage is performed on a wafer whose state is an output of the preceding stage.

For example, linkage 1114 interconnecting cells 1101 and 1102 represents the straight forward transition between a first and a second shown manufacturing steps.

Linkages further normally include those based upon proven casual relationships. Proven casual relationships are defined as those relationships for which there is an empirical evidence such that changes in the parameter or metric of the source or input interconnection cell produces significant changes in the output of the of the destination interconnection cell.

Significant changes are defined as those that produce differences greater than a selected sigma value (such as 2σ) of the calculated standards deviation of the value designation as in-specification. For example, linkage 1122 connects interconnection cells "Expose" 1102 and "Etch" 1106.

This is so because empirical data exists that proves that changing a metric of the "Expose" manufacturing step will produce a significant change in the output obtained by the later executed "Etch" manufacturing step.

Linkages may still further include those based upon alleged causal relationships. These relationships are usually, but not limited to those relationships suggested by professional experts in the manufacturing process or some portion thereof.

An example of such a relationship is demonstrated by arrow 1124 which is seen to connect interconnection cells "Bake" 1104 and "Resist Strip" 1109.

Linkages of this type which are not commonly anticipated, they may be tentatively established and added to the Knowledge-Tree on any basis whatever; real, imagined, supposed or otherwise.

As it was explained, it is an integral part of the construction of the Knowledge-Tree to later test and validate these linkages.

While the invention has been described with respect to a limited number of embodiments, it will be appreciated that many variations, modifications and other applications of the invention may be made.

What is claimed is:

1. A method for automated decision-making comprising the steps of:
   constructing a series of interconnection cells and using values obtained thereby as decision makers, said construction comprising:
   a) modeling of relations between a plurality of objects in a system, each object having at least one outcome, each object being subjected to at least one influential factor affecting said at least one outcome and building said modeled relations as interconnections between said interconnection cells;
   b) carrying out computerized data mining in datasets associated with said modeled relations between said at least one outcome and said at least one influential factor of at least one said object, and constraining said data mining to relations modeled by said interconnections;
   c) building a quantitative model to predict a score for said at least one outcome, by attributing values from said data mining to said relations; and
   d) making an output decision for said system according to said score of said at least one outcome of said at least one object.

2. The method as in claim 1 wherein said modeling of relations comprises:
   (i) selecting at least two of said plurality of objects;
   (ii) for each of said at least two objects, defining at least one outcome;
   (iii) for each of said at least one outcome, identifying at least one influential factor;
   (iv) validating an influence of said at least one possible influential factor on each of said at least one outcome respectively; and,
   (v) symbolizing graphically said at least two objects, said outcomes of said at least two objects and said influences of said outcomes of said at least two objects.

3. The method as in claim 2 wherein said selecting of said plurality of objects with in said system is based on knowledge selected from the group consisting of disciplinary knowledge and structural knowledge that are appropriate for a specific functional operation of said system.

4. The method as in claim 2 wherein said disciplinary knowledge is selected from the group consisting of warehouse data and expert experience.

5. The method as in claim 2 wherein said structural knowledge is selected from the group consisting of functional, configurational, logical and heuristic structure.

6. The method as in claim 2 wherein said at least one outcome of a said at least one object is defined by an expert having expertise in a domain of said at least one object.

7. The method as in claim 2 wherein said at least one influential factor on said at least one outcome of said at least one object is defined by an expert having expertise in a domain of said at least one object.

8. The method as in claim 2 wherein said validating of an influence of said at least one possible influential factor on said at least one outcome includes seeking for a correlation between said at least one possible influential factor and said at least one outcome.

9. The method as in claim 2 comprising constructing said interconnection cells such that one of said at least one outcomes of a first of said plurality of objects is an influence on one of said at least one outcomes of a second of said plurality of objects.

10. The method as in claim 2 wherein said graphical symbolization is stored in a memory of a computer.

11. The method as in claim 1 wherein said data mining is effected using statistical techniques selected from the group consisting of linear regression, nearest neighbor, clustering, process output empirical modeling (POEM), classification and regression tree (CART), chi-square automatic interaction detector (CHAID), decision trees and neural network empirical modeling.

12. The method as in claim 1 wherein said building of said quantitative model is effected using statistical techniques selected from the group consisting of linear regression, nearest neighbor, clustering, process output empirical modeling (POEM), classification and regression tree (CART), chi-square automatic interaction detector (CHAID), decision trees and neural network empirical modeling.

13. A knowledge engineering tool for defining a relationship pattern among a plurality of objects, said tool comprising:
   a graphical symbolization unit for symbolizing said objects and assumed interactions thereof by constructing at least two interconnection cells to represent components of a system whose relationship pattern is to be defined and connections therebetween to indicate said assumed interactions;
   and a numerical processor, associated with said graphical symbolization unit for carrying out computerized data mining amongst data representative of said system, and using said relationship pattern as a dimension reduction constraint on said data mining, said computerized data mining to attach numerical values to said connections, therefrom to form a utilizable model of said system.

14. The knowledge engineering tool as in claim 13 wherein said component of said system is selected from the group consisting of physical and logical elements of said system.

15. The knowledge engineering tool as in claim 13 having a plurality of said interconnection cells organized according to an a priori structural knowledge of said system.

16. The knowledge engineering tool as in claim 15 wherein said a priori structural knowledge of said system is derived from information selected from the group consisting of warehouse data and expert experience.

17. The knowledge engineering tool as in claim 15 wherein said a priori structural knowledge of said system is derived from knowledge selected from the group consisting of functional, configurational, logical and heuristic structure of said system.

18. The knowledge engineering tool as in claim 15 wherein said a priori structural knowledge is derived from a member selected from the group consisting of process flow diagrams, process maps and layout drawings of said system.

19. The knowledge engineering tool as in claim 13 wherein said at least one interconnection cell has at least one output which represents an outcome of an object symbolized by said at least one interconnection cell.

20. The knowledge engineering tool as in claim 19 wherein said at least one interconnection cell has at least one input which represents an influential factor on said at least one output of said at least one interconnection cell.

21. The knowledge engineering tool as in claim 19 wherein said at least one output is selected from the group consisting of measurable output and controlled output.

22. The knowledge engineering tool as in claim 20 wherein said at least one input is selected from the group consisting of measurable input and controlled input.

23. The knowledge engineering tool as in claim 20 including at least two interconnection cells and in which said output of a first of said at least two interconnection cells is an input to a second of said at least two interconnection cells.

24. The knowledge engineering tool as in claim 20 wherein a controllable output of said first interconnection cell is a measurable input to said second interconnection cell.

25. The knowledge engineering tool as in claim 20 wherein said at least one input is an inner interrelated input.

26. The knowledge engineering tool as in claim 20 wherein said at least one input is a non obvious outside influential input.

27. A computer usable medium having a computer readable program code, the program code comprising:
   a graphical symbolization unit for symbolizing objects and assumed interactions thereof by constructing at least two interconnection cells to represent components of a system whose relationship pattern is to be defined and connections therebetween to indicate said assumed interactions;
   and a numerical processor associated with said graphical symbolization unit for carrying out computerized data mining amongst data representative of said system using said connections as constraints on said computerized data mining, thereby to attach numerical values to said connections to form a Knowledge-Tree map to generate a knowledge base in a data storage region of a computer.

28. The computer usable medium as in claim 27 wherein said program code is a sub-routine of a program of an automatic decision-making process.

29. The computer usable medium as in claim 28 wherein said automatic decision-making process is a part of a process control.

30. The computer usable medium as in claim 28 wherein said automatic decision-making process is suitable for a diagnostic expert system.

31. The computer usable medium as in claim 28 wherein said automatic decision-making process is suitable to trouble-shoot a process output.

32. The computer usable medium as in claim 28 wherein said automatic decision-making process is part of a microelectronics device fabrication process.

33. An automatic decision-making system comprising:
   a) a data mining tool for carrying out computerized data mining to analyze available data with respect to a system to find correlations between an outcome within said system and influential factors on the outcome;
   b) a Knowledge-Tree map, associated with said data mining tool for modeling a system as a series of interconnection cells with connections therebetween to represent said correlations, said Knowledge-Tree map being configured to constrain said data mining tool to correlations mapped thereon, thereby to reduce a dimension of said data mining;
   c) an empirical modeler, associated with said data mining tool and said Knowledge-Tree map to use quantitative values attached to said mapped connections by said data mining tool to predict a score of said outcome; and,
   d) a decision making tool, associated with said empirical modeler, to make decisions regarding said system in accordance with said score.

34. A system as in claim 33 wherein said data mining uses statistical techniques selected from the group consisting of linear regression, nearest neighbor, clustering, process output empirical modeling (POEM), classification and regression tree (CART), chi-square automatic interaction detector (CHAID), decision trees and neural network empirical modeling.

35. A system as in claim 33 wherein said Knowledge-Tree map is a knowledge engineering tool for describing relationship pattern between plurality of objects, comprising a graphical symbolization of the objects and their relations, said graphical symbolization includes at least one interconnection cell which represents a component of a system whose said relationship pattern being described by said knowledge engineering tool.

36. A system as in claim 33 wherein said empirical modeler uses statistical techniques selected from the group consisting of linear regression, nearest neighbor, clustering, process output empirical modeling (POEM), classification and regression tree (CART), chi-square automatic interaction detector (CHAID), decision trees and neural network empirical modeling.

* * * * *